United States Patent
Wang et al.

(10) Patent No.: US 6,533,412 B1
(45) Date of Patent: Mar. 18, 2003

(54) INTERCHANGEABLE EYEGLASS LENS SYSTEM AND METHOD

(75) Inventors: Chih Kuan Wang, Guang Zhou (CN); Tianshi Wang, Denver, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 0 days.

(21) Appl. No.: 10/199,029

(22) Filed: Jul. 22, 2002

(51) Int. Cl.[7] .................................................. G02C 1/00
(52) U.S. Cl. .......................................... 351/86; 351/106
(58) Field of Search .............................. 351/86, 83, 84, 351/90, 91, 92, 103, 106, 124, 133, 134, 135, 41

(56) References Cited

U.S. PATENT DOCUMENTS

| | | | |
|---|---|---|---|
| 4,360,252 A | 11/1982 | Solomon | |
| 4,551,251 A | 11/1985 | Kolobow et al. | |
| 4,730,915 A | 3/1988 | Jannard | |
| 4,759,622 A | 7/1988 | Schmidthaler | |
| 4,813,775 A | 3/1989 | Kaksonen | |
| 4,834,523 A | 5/1989 | Porsche | |
| 4,857,187 A | 8/1989 | Ito | |
| 4,951,322 A | 8/1990 | Lin | |
| 4,968,428 A | 11/1990 | Nunogaki | |
| 5,098,180 A | 3/1992 | Tobey | |
| 5,189,447 A | 2/1993 | Oleson | |
| 5,257,050 A | 10/1993 | Wiedner | |
| 5,293,185 A | 3/1994 | Berger et al. | |
| 5,321,444 A | 6/1994 | Lin | |
| 5,467,148 A | 11/1995 | Conway | |
| 5,587,747 A | 12/1996 | Bernheiser | |
| 5,703,669 A | * 12/1997 | Park | ............................ 351/106 |
| 6,059,409 A | 5/2000 | Sheldon | |
| 6,386,704 B1 | * 5/2002 | Wu | .............................. 351/106 |

\* cited by examiner

*Primary Examiner*—Hung Xuan Dang
(74) *Attorney, Agent, or Firm*—Jacobson Holman PLLC

(57) ABSTRACT

A pair of eyeglasses having a frame with interchangeable lenses and a method of interchanging the lenses. The frame has a centrally located nosepiece and two end portions. Each lens has a substantially circular aperture adjacent the nosepiece of the frame and a notch adjacent a respective end portion of the frame. The notch fits over a corresponding tang in the frame end to secure the outer portion of the lens while protruding pins on the frame adjacent the nosepiece engage the circular aperture of each lens. A hinged locking mechanism is snapped over that portion of the lens engaging the pins, preventing disengagement of the lenses from the pins. To replace the lenses, the hinged locking mechanism is opened, allowing the lenses to be disengaged from the pins and pulled from the tangs.

13 Claims, 3 Drawing Sheets

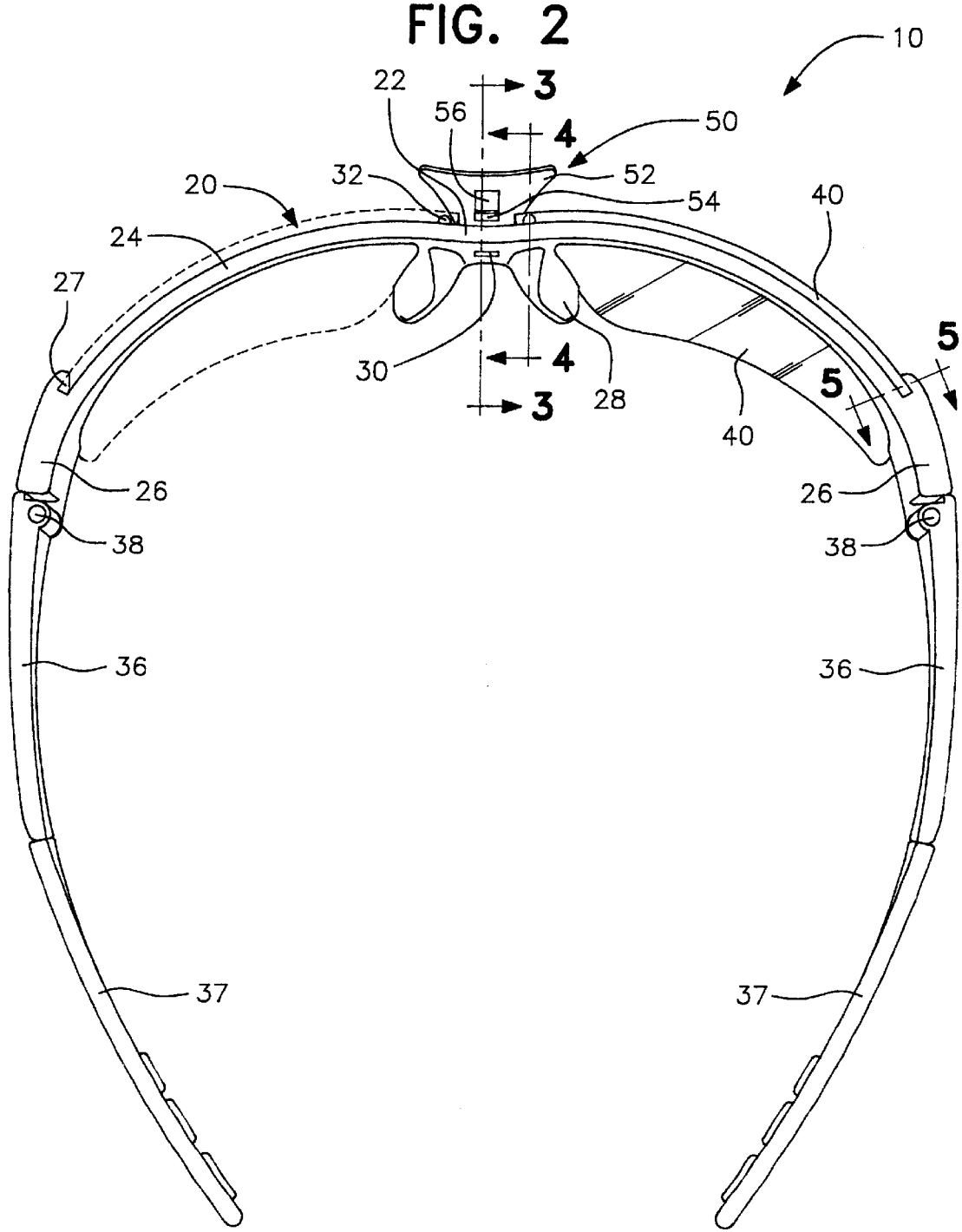

INTERCHANGEABLE EYEGLASS LENS SYSTEM AND METHOD

BACKGROUND OF THE INVENTION

1. Field of the Invention

The present invention is related to the field of eyewear and, more particularly, to eyewear having interchangeable lenses and a method of exchanging such lenses.

2. Description of the Related Art

Eyeglasses are worn pervasively, whether for protection from the sun and/or airborne debris, vision correction, fashion enhancement, etc. Given the range of uses, a single pair of eyeglasses is rarely suitable for all applications, necessitating the purchase and maintenance of multiple pairs of glasses or some sort of multiple-lens system.

Eyewear with replaceable lenses has been available for some time. However, many of the replaceable lens systems are mechanically complicated, often requiring tools to complete the exchange of one set of lenses with another. With such systems, the lens exchange process is often so burdensome that the advantage offered by such interchangeability is rarely enjoyed because it is just too much trouble. Other systems require that the lenses be manually deformed to a considerable extent, stressing the structure and also making the exchange process difficult.

Accordingly, a need still exists for an eyewear system having interchangeable lenses in which the process required for lens substitution is quick and easily accomplished. With such a system, users are encouraged to convert a single frame into a pair of darkly tinted sunglasses, for example, then to a pair of clear safety-type glasses, then to an amber tinted light-enhancement pair of glasses, etc., as many times as circumstances dictate, because the process can be completed simply and in a matter of seconds.

SUMMARY OF THE INVENTION

In view of the foregoing, one object of the present invention is to overcome the difficulties of previous replaceable lens eyewear systems with a pair of eyeglasses in which the lenses may be interchanged quickly and easily.

Another object of the invention is eyewear having two lenses which can be replaced individually.

A further object of the invention is eyewear having interchangeable lenses in which no tools are required to effect lens replacement.

Yet another object of the invention is a method of interchanging a lens in an eyeglass frame.

In accordance with this and other objects, the present invention is directed to a pair of eyeglasses having a frame and two lenses. The frame has a centrally located nosepiece and is connected at either end with a temple member. Each lens has a substantially circular aperture adjacent the nosepiece of the frame and a notch adjacent a respective end of the frame. The notch fits over a corresponding tang in the frame end to secure the outer portion of the lens while protruding pins on the frame adjacent the nosepiece engage the circular aperture of each lens. Once the lenses are positioned on the pins and in engagement with the tangs, a hinged locking mechanism is snapped over that portion of the lens engaging the pins, securing the lenses in place. To replace the lenses, the hinged locking mechanism is opened, allowing the lenses to be disengaged from the pins and pulled from the tangs.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top view of the eyewear according to the present invention with the locking mechanism open and only the right lens mounted to the frame;

DETAILED DESCRIPTION OF THE PREFERRED EMBODIMENTS

Figure 1:
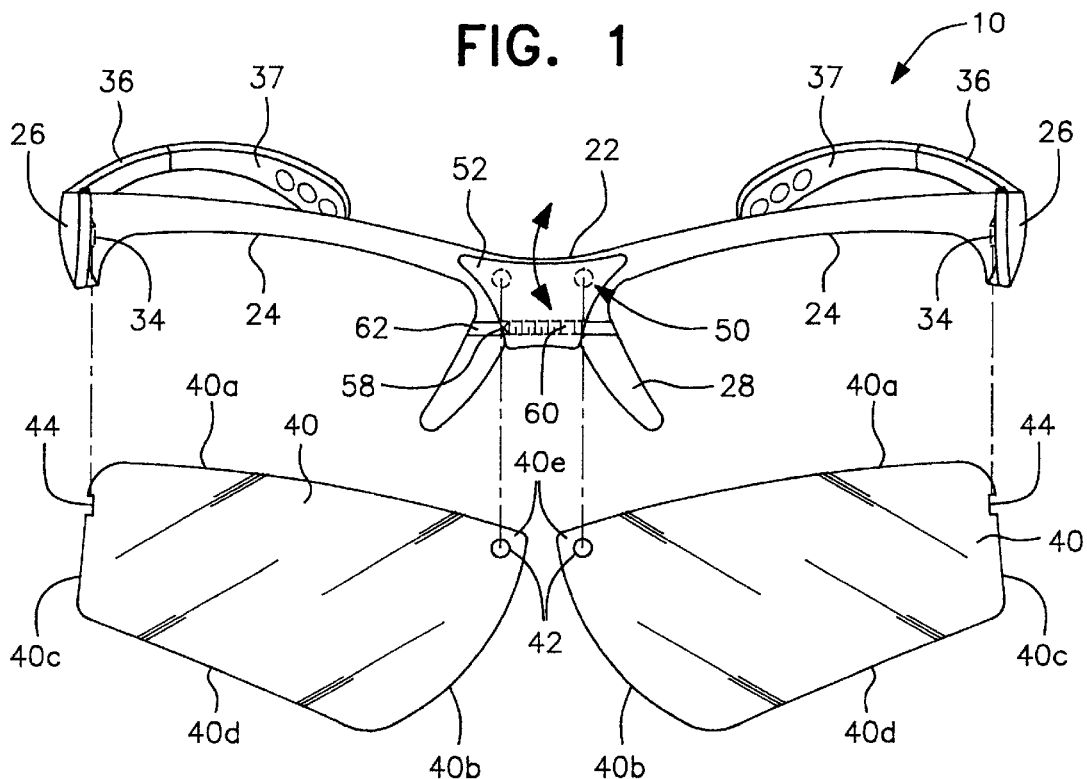
FIG. 1 is an exploded front view of a frame with interchangeable lenses defining the eyewear according to the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

The eyewear with interchangeable lenses, generally designated by the reference numeral 10, is illustrated in FIGS. 1 and 2. As shown, the eyewear 10 includes a frame, generally designated by the reference numeral 20, having a locking mechanism, generally designated by the reference numeral 50. The eyewear 10 also includes two individually replaceable lenses 40, and associated temple members 36 and ear pieces 37. As shown in FIG. 2, the temple members 36 are coupled to the frame 20 using hinges 38 as is known in the art. For ease of description, that side of the frame which is viewable by a person not wearing the eyewear is termed the front side, and the opposite side of the frame which is nearest the wearer is termed the rear side.

The two lenses 40 are separate from one another such that either can be replaced independently. Each lens has an upper edge 40a, an inner edge 40b, an outer edge 40c and a lower edge 40d. Inset from the inner corner portion 40e, where the upper edge 40a and the inner edge 40b, meet, each lens has a generally circular aperture 42. Each lens also has a notch 44 formed along the outer edge 40c.

The frame 20 includes a center portion 22 having a generally rectangular aperture 30 therein. Extending from the center portion 22 on either side of the aperture 30 on the front side of the frame are two pins 32. The center portion 22 is formed integrally with rim portions 24 and end portions 26. The frame also includes a nosepiece 28 which, as shown in FIGS. 1 and 2, may also be integral with the center portion 22 of the frame 20. A detachable nosepiece could also be employed.

Each end portion 26 includes a channel 27 for receiving the outer edge 40c of a respective lens 40. Within the channel 27, preferably approximately midway therealong, is a raised nub or tang 34. The notch 44 in the lens is sized and positioned so as to engage the tang 34 within the channel 27 on the respective end portion 26 of the frame 20. Similarly, the aperture 42 in the lens is sized and positioned to engage a respective one of the pins 32 extending from the center portion 22 of the frame when the notch 44 is properly positioned on the tang 34.

The locking mechanism 50 is coupled to the center portion 22 of the frame 20, and includes a face plate 52, a hook portion 54, and a resilient connecting portion 56 joining the face plate 52 and the hook 54. The face plate 52 is connected to the front side of the frame by a hinge 58 with a screw 60 running therethrough. To accommodate the circumference of the hinge 58, a groove 62 which extends from one side of the nosepiece 28 to the other may be formed on the front side of the frame.

Figure 3:
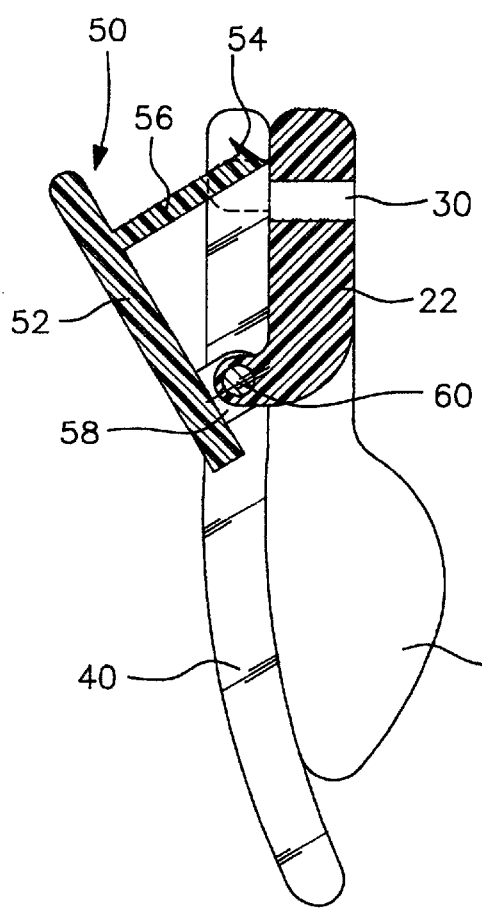
FIG. 3 is a sectional view taken along line 3—3 of FIG. 2.
Figure 4:
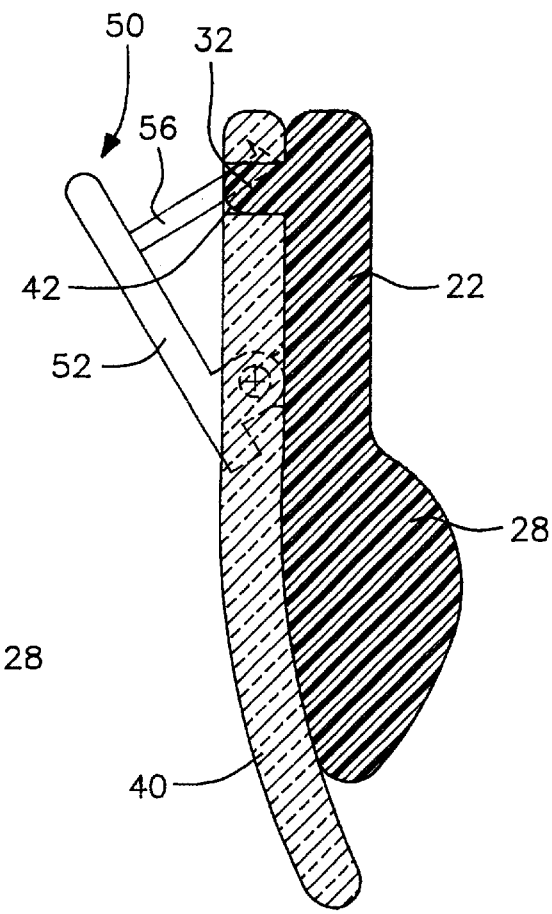
FIG. 4 is a sectional view taken along line 4—4 of FIG. 2.
Figure 5:
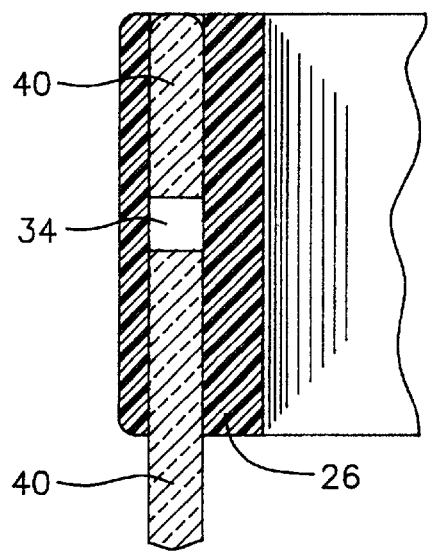
FIG. 5 is a sectional view taken along line 5—5 of FIG. 2.

FIGS. 3 and 4 present cross-sectional views of the locking mechanism 50 along the indicated lines set forth in FIG. 2 in which the locking mechanism 50 is shown in the open position. FIG. 5 illustrates a sectional view along line 5—5 of FIG. 2, showing the lens 40 and the tip of the tang 34 as protruding through the notch.

When the lenses are mounted, the notch 44 in the lens fits over the tang 34 and the pin 32 extends through the lens aperture 42. To lock the lens in position, the face plate 52 of the locking mechanism 50 is pressed toward the frame to be adjacent to and substantially parallel with the front side of the frame. In this position, the hook portion extends sufficiently through the frame aperture 30 to snap into engagement with the rear side of the frame, securing the locking mechanism and keeping the lenses pressed against the front side of the frame.

The invention also includes a method of interchanging a lens in an eyeglass frame. According to the invention, with the locking mechanism in the open position, a lens is mounted to the frame by engaging the tang 34 with the notch 44 and then mounting the inner corner portion 40e of the lens by placing the lens aperture 42 over the pin 32. To thereafter close the locking mechanism, the hook 54 and flexible connecting portion 56 are inserted through the aperture 30 by pressing on the face plate with the thumb or finger. The mechanism is locked in place when the hook 54 is fully extended through and catches against the rear side of the frame. In this locked position, as shown in FIG. 6, the face plate 52 closely overlies the inner corner portion 40e of the lens 40, covering the aperture 42 and preventing the lens from disengaging from the pin 32.

Figure 6:
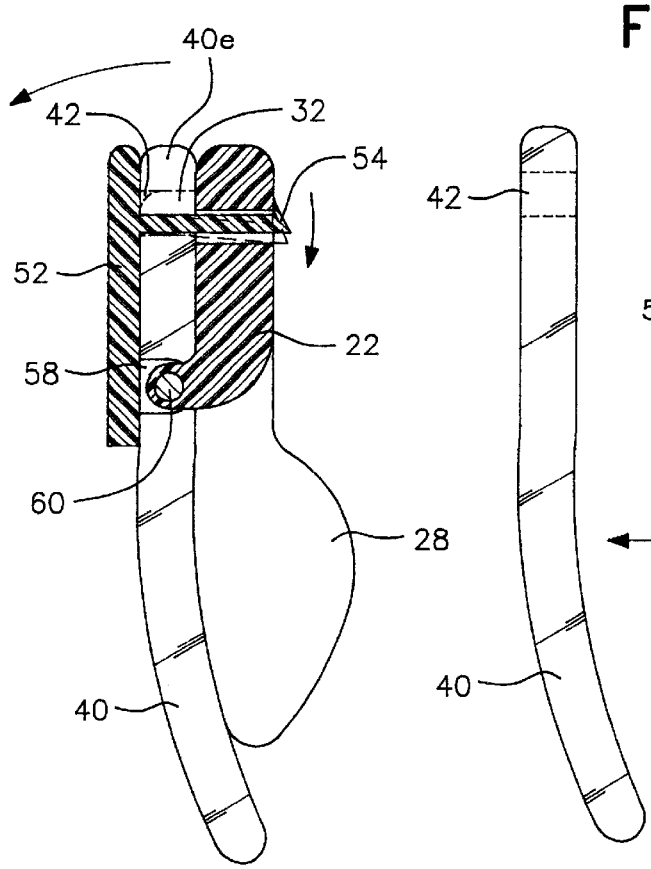
FIG. 6 depicts the sectional view of FIG. 3 after the locking clip mechanism has been closed and showing the range of motion of the resilient connecting portion which allows opening of the mechanism.
Figure 7:
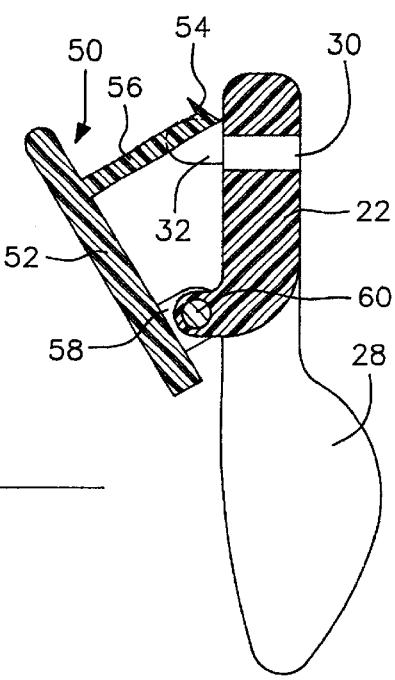
FIG. 7 is an exploded view of the eyewear of FIG. 3 with the lens removed from the frame.

To open the locking mechanism, the resilient connecting portion 56 is flexed downward, as shown by the arrow in FIG. 6, through finger or thumb pressure applied to the hook portion 54. When the hook portion 54 has been lowered to the position indicated by the dotted line, the hook may be disengaged from the rear side of the frame and made to pass through the aperture 30 by outward pressure on the face plate 52. The face plate 52 pivots on the hinge 58 to release the connecting portion 56 and the hook portion 54 from the frame aperture 30, as shown in FIG. 7. Through such pivoting action, the aperture 42 within the lens 40 may be removed from the pin 32, releasing the inner corner portion 40e. The lens may then be pulled upwardly, toward and above the nosepiece, to disengage the notch 44 from the tang 34 and free the lens.

The eyewear with interchangeable lenses according to the present invention provides a simple yet sturdy design for replacing or exchanging lenses within a frame. The lenses, through the combination of the notch 44 and lens aperture 42, are securely held within the frame by the tangs 34, pins 32 and locking mechanism 50. The locking mechanism has an uncomplicated design that can be easily manufactured. Furthermore, should any portion of the locking mechanism be damaged, the screw 60 can be removed to allow removal of that portion of the hinge 58 connected to the face plate 52, and subsequent mounting of a replacement locking mechanism 50.

The present invention may also be embodied with a single lens. In such alternative embodiment, each of the outer edges of the lens are provided with a notch for engagement with a corresponding channel and tang in the end portions of the frame, as with the embodiment already described. However, the center portion of the frame may be constructed with one, two or no pins. In this alternative embodiment, the center portion of the unitary lens includes a centrally-located locking mechanism aperture to allow the connecting portion and hook of the locking mechanism to pass therethrough to allow the hook to be secured against the rear side of the frame. The lens may further include a number of smaller apertures corresponding in number to a quantity of pins extending from the front side of the frame. As just noted, the frame may be constructed without pins, with the lens being secured to such frame through the notches and tangs on either end portion, in combination with the locking mechanism passing through the locking mechanism aperture to secure the lens to the front side of the frame in a manner such as has already been described.

The foregoing descriptions and drawings should be considered as illustrative only of the principles of the invention. The eyeglasses may be configured in a variety of shapes and sizes and are not limited by the style of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. An interchangeable eyeglass lens system comprising:

at least one interchangeable lens having an outer edge with a notch therein and an inner corner portion having a lens aperture therethrough;

a frame having a center portion and two end portions, said center portion having a center aperture and including at least one pin on a front side of said frame for engaging with said lens aperture of said at least one lens, at least one end portion having a channel with a tang located therealong, said channel for receiving said outer edge of said at least one lens and said tang for engaging with said notch in said at least one lens when said at least one lens is mounted to said frame; and a locking mechanism hingedly connected to said center portion and having a locked position and an open position, said locked position for securing said at least one lens against said front side of said frame when said lens is mounted on said at least one pin, said open position allowing said at least one lens to be disengaged from said at least one pin for removal of said at least one lens.

2. The interchangeable eyeglass lens system as set forth in claim 1, wherein said locking mechanism includes a face plate, a hook and a connecting portion joining said face plate and said hook, said hook and said connecting portion extending through said center aperture and said face plate being substantially parallel with a viewing plane of said at least one lens when said locking mechanism is in said locked position, said face plate thereby securing said at least one lens against said front side of said center portion.

3. The interchangeable eyeglass lens-system as set forth in claim 2, wherein said face plate is connected to said center portion with a hinge having a screw running therethrough.

4. The interchangeable eyeglass lens system as set forth in claim 1, wherein said lens aperture is generally circular and said center aperture is generally rectangular.

5. The interchangeable eyeglass lens system as set forth in claim 1, including:

two interchangeable lenses, each of said lenses having an outer edge with a notch therein and an inner corner portion having a lens aperture therethrough;

said center portion having two pins, one pin on either side of said center aperture, each of said two pins engaging a respective one of said two lens apertures to secure said inner corner portions of said lenses to said frame.

6. The interchangeable eyeglass lens system as set forth in claim 5, wherein each of said two end portions includes a channel with a tang therealong for receiving the outer edge of a respective one of said two lenses.

7. The interchangeable eyeglass lens system as set forth in claim 5, wherein said connecting portion extends substantially perpendicular to said face plate.

8. An interchangeable eyeglass lens system comprising:

two interchangeable lenses, each of said lenses having an outer edge with a notch therein and an inner corner portion having a generally circular lens aperture;

a frame having a center portion and two end portions, said center portion having a center aperture therethrough and including two pins, one pin on either side of said center aperture, each of said two pins engaging a respective one of said two lens apertures to secure said inner corner portions of said lenses to said frame;

each of said two end portions having a channel therein with a tang located therealong, each of said channels for receiving the outer edge of a respective one of said two lenses, and each of said tangs for engaging with the notch in said respective outer edge when said lenses are mounted to said frame; and a locking mechanism hingedly connected to said center portion and having a locked position and an open position, said locked position for securing said lenses against said front side of said frame when said lens apertures are mounted on said pins and said tangs engage said notches, said open position allowing said lenses to be disengaged from said pins for removal of said lenses.

9. The interchangeable eyeglass lens system as set forth in claim 8, wherein said locking mechanism includes a face plate, a hook portion and a connecting portion joining said face plate and said hook portion, said hook portion and said connecting portion extending into said center aperture and said face plate being substantially parallel with a viewing plane of said lenses when said locking mechanism is in said locked position, said face plate thereby securing said lenses against said front side of said center portion.

10. The interchangeable eyeglass lens system as set forth in claim 9, wherein said face plate is connected to said center portion with a hinge having a screw running therethrough.

11. The interchangeable eyeglass lens system as set forth in claim 9, wherein said connecting portion extends substantially perpendicular to said face plate.

12. A method of changing a lens in an eyeglass frame having a center portion and two end portions, comprising the steps of:

removably attaching the lens by aligning a notch in an outer edge of said lens with a tang located in a channel in one of said end portions;

pivoting said lens around said tang to align a lens aperture in an upper corner portion of said lens with a pin extending outwardly from a front side of said center portion;

pressing said lens against said front side so that said pin extends through said lens aperture; and applying pressure to a face plate of a locking mechanism hingedly attached to said front side of said center portion to force a hook portion attached to a rear side of said mechanism through a frame aperture in said center portion until said hook portion snaps upward into a locked position against a rear side of said frame, said face plate overlying said lens aperture to secure said lens on said pin.

13. The method of changing a lens in an eyeglass frame as set forth in claim 12, further comprising the steps of:

pressing downward on said hook portion to disengage said hook portion from said rear side and, simultaneously, applying pressure against an upper edge of said face plate of said locking mechanism to force said face plate away from said front side of said frame;

pivoting said locking mechanism away from said front side to disengage the hook portion from said frame aperture;

pulling the upper corner portion of said lens away from said front side until said lens aperture is clear of said pin; and pivoting the upper corner portion of said lens upwardly to release the outer edge and notch from said channel and said tang.

* * * * *